May 16, 1933. E. GESSNER 1,909,099
VARIABLE SPEED AND FREEWHEELING TRANSMISSION MECHANISM
Filed Aug. 18, 1931 4 Sheets-Sheet 1
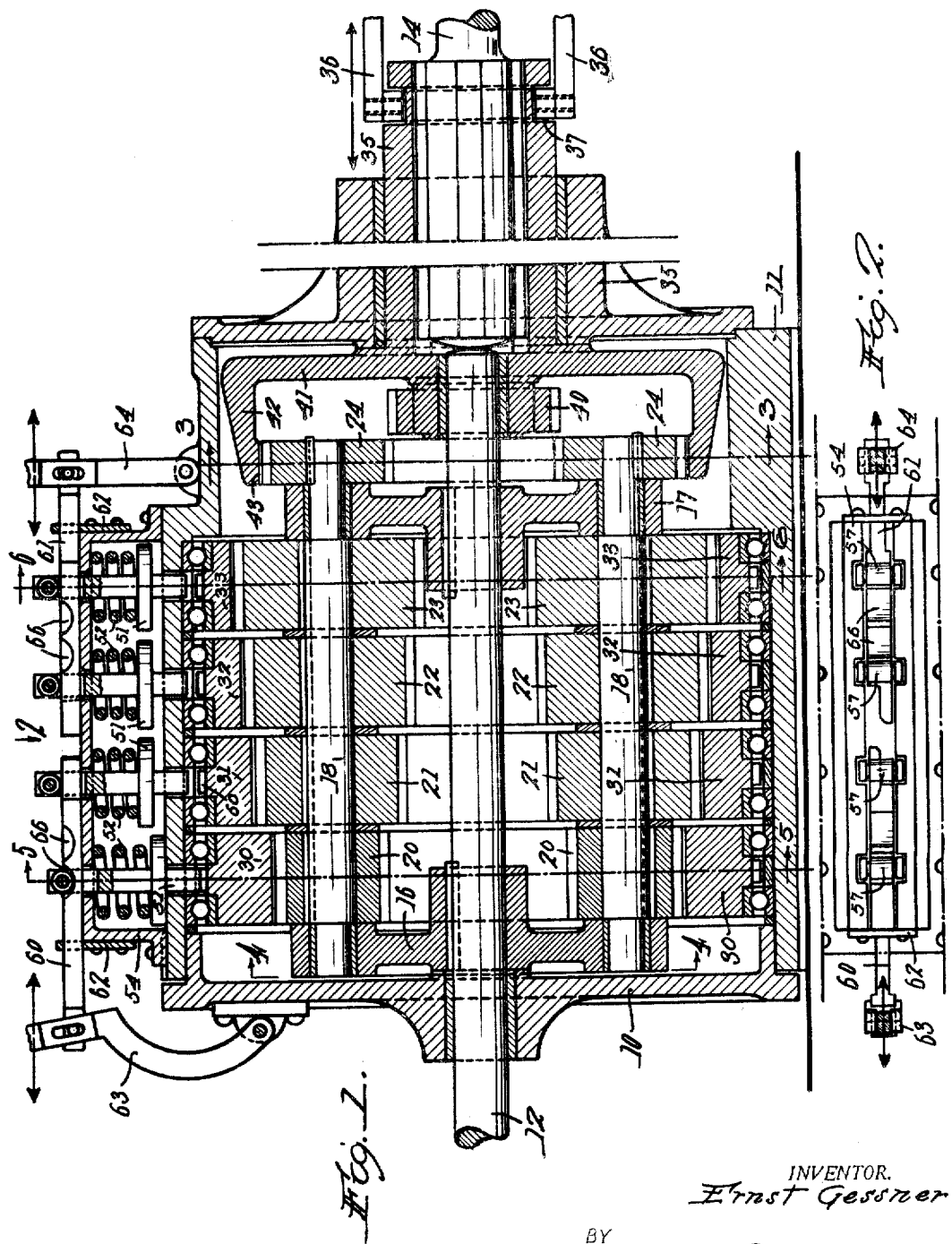
INVENTOR.
Ernst Gessner May 16, 1933.  E. GESSNER  1,909,099
VARIABLE SPEED AND FREEWHEELING TRANSMISSION MECHANISM
Filed Aug. 18, 1931  4 Sheets-Sheet 2

INVENTOR.
Ernst Gessner
BY
Southgate Hay + Hawley
ATTORNEYS

May 16, 1933.  E. GESSNER  1,909,099
VARIABLE SPEED AND FREEWHEELING TRANSMISSION MECHANISM
Filed Aug. 18, 1931   4 Sheets-Sheet 3

INVENTOR.
Ernst Gessner
BY
ATTORNEYS

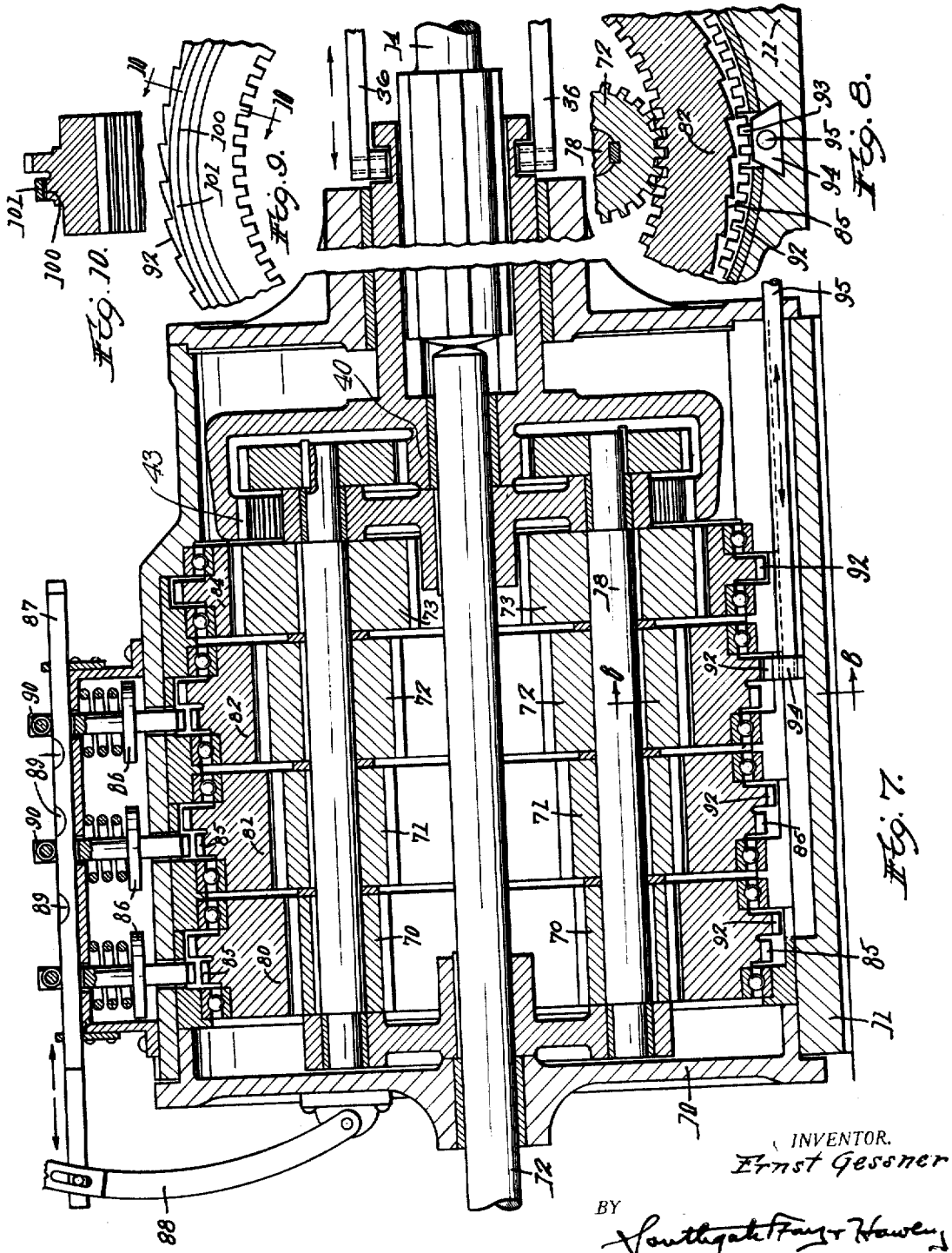

Patented May 16, 1933

1,909,099

UNITED STATES PATENT OFFICE

ERNST GESSNER, OF WORCESTER, MASSACHUSETTS

VARIABLE SPEED AND FREEWHEELING TRANSMISSION MECHANISM

Application filed August 18, 1931. Serial No. 557,750.

This invention relates to transmission mechanism adapted for general purposes, but particularly designed for use in automobiles. It is the general object of the invention to provide improved mechanism by which different transmission speeds may be obtained and by which the advantage of free wheeling is rendered available.

To the accomplishment of this object, I have made certain changes and improvements in speed changing transmission mechanism of the type shown and described in my prior Patent No. 1,808,539, issued to me June 2, 1931.

A preferred form of my invention and certain modifications thereof are shown in the drawings, in which Fig. 1 is a sectional side elevation of my improved transmission mechanism;

Fig. 2 is a plan view of certain parts, looking in the direction of the arrow 2 in Fig. 1;

Figs. 3, 4, 5 and 6 are transverse sectional elevations, taken along the lines 3—3, 4—4, 5—5 and 6—6 in Fig. 1;

Fig. 7 is a sectional side elevation of a modified construction;

Fig. 8 is a detailed sectional elevation, taken along the line 8—8 in Fig. 7;

Fig. 9 is a detail side elevation of a modified construction of ring gear, and

Fig. 10 is a detail sectional view taken along the line 10—10 in Fig. 9.

Figure 3:
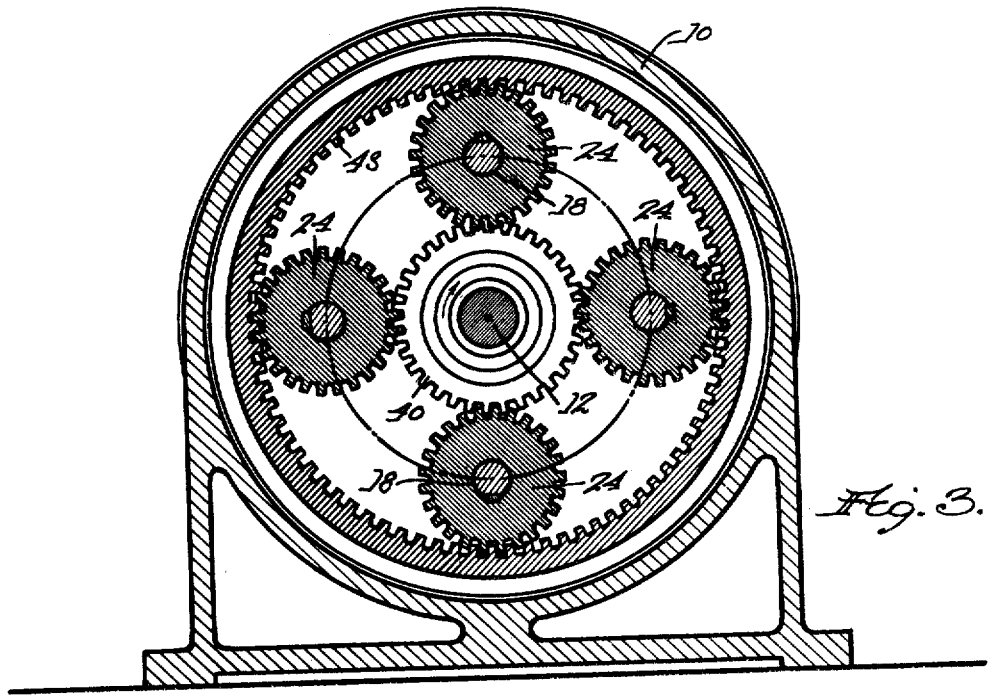
Figure 4:
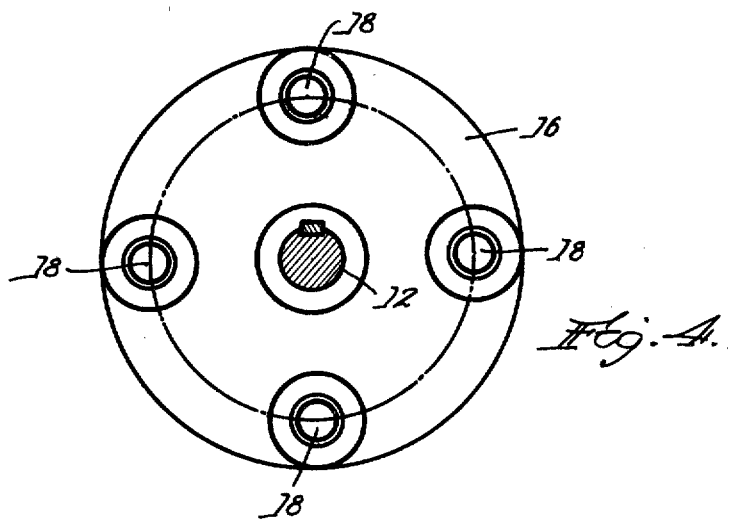

Referring to Figs. 1 to 6 I have shown a variable speed transmission mechanism which is in many respects similar to the construction shown in my prior patent above referred to. I have shown a casing 10 mounted on a suitable base 11 and providing bearings for a driving shaft 12 and a driven shaft 14.

The driving shaft 12 may be connected to the engine of an automobile or to any other convenient source of power and the driven shaft 14 may be connected to rotate the wheels of an automobile or to supply power for any other desired purpose.

A carrier comprising end members 16 and 17 is mounted on the driving shaft 12, with the members 16 and 17 secured in spaced relation on the shaft and positively rotated thereby.

A plurality of short shafts 18 are rotatably mounted in an annular series in bearings in the members 16 and 17, and each shaft 18 has a series of pinions 20, 21, 22 and 23 secured thereon between the end members 16 and 17. Each shaft 18 has a gear 24 secured thereon, outside of the end member 17.

Figure 5:
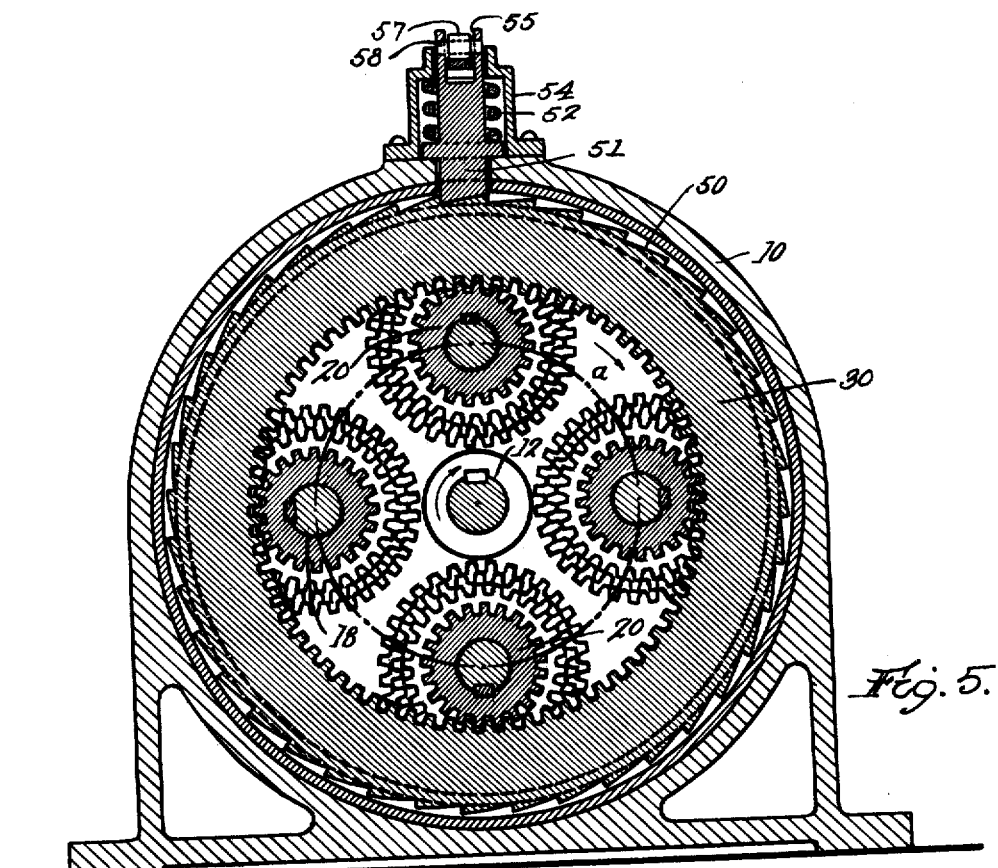
Figure 6:
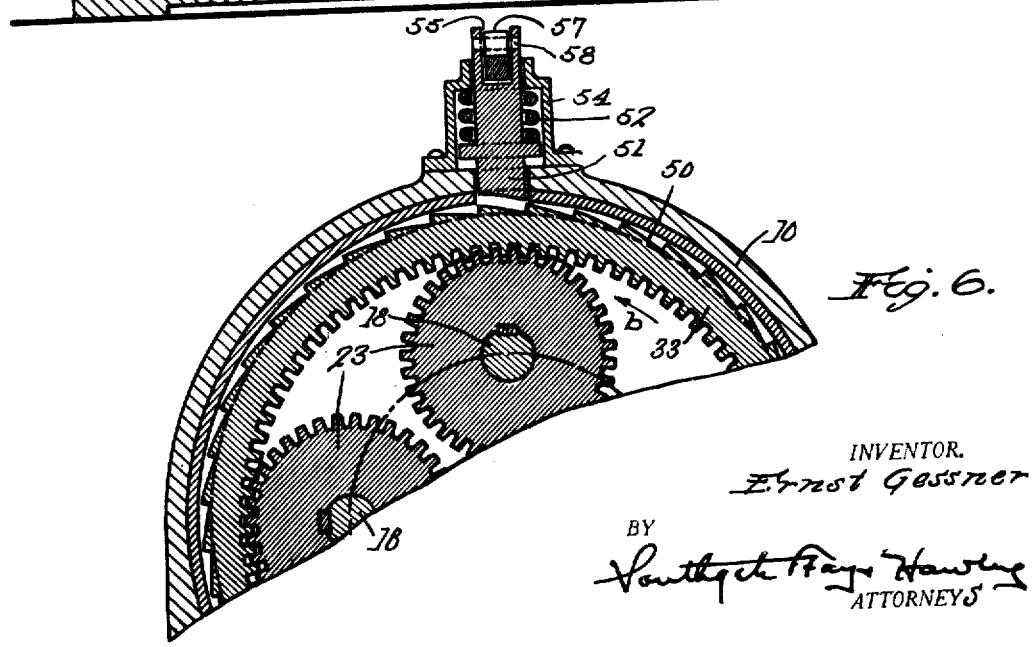

A series of ring gears 30, 31, 32 and 33 are mounted in anti-friction bearings in the casing 10, and each ring gear is engaged by all of the pinions of a given set on the shaft 18. For instance, the ring gear 30 is engaged by all of the pinions 20, as shown in Fig. 5, and the ring gear 33 is engaged by all of the pinions 23, as shown in Fig. 6. It will be understood that the ring gears are mounted concentric with the driving shaft 12 and with the driven shaft 14.

A sleeve 35 is keyed to the driven shaft 14 and is slidable thereon by yoke members 36, engaging a circumferential groove or recess 37 in the sleeve 35. The inner end of the sleeve 35 is provided with a gear 40 and is also enlarged to form a disc 41 having a flange 42, and the outer edge portion of which is formed as an internal gear 43.

The relation of the gears 40 and 43 to the gears 24 previously described is best shown in Fig. 3, from which it appears that the gears 24 mesh with the internal gear 43 when the sleeve 35 is moved outward or to the right in Fig. 1, and with the gear 40 when the sleeve is moved inward or to the left in Fig. 1.

Assuming that the ring gears 30, 31, 32 and 33 are all free to rotate, it is obvious that rotation of the carrier by the shaft 12 will simply carry the ring gears around with their sets of pinions and that the gears 24 will roll freely with respect to the gear 40 or the gear 43, transmitting no power whatever except such slight amount as might be caused by the frictional retardation of the ring gears. In this case power will be directly transmitted by engagement of the gears 24 with both gears 40 and 43.

If, however, one of the ring gears, such as the ring gear 30, is held in fixed position, the rotating carrier will cause the pinions 20 to travel in a circular path about the axis of the shaft 12 and also to rotate about their individual axes by reason of their rolling contact with the temporarily fixed ring gear 30.

The gears 24 on the pinion shafts 18 are thus positively rotated about their own axes, as well as being carried around in a circular path about the axis of the shaft 12, and the gears 24 will accordingly rotate the gear 40 or 43 with which they are in engagement, thus positively driving the shaft 14.

Both the direction and speed of the shaft 14 depends upon the relative diameters of the pinions 20, 21, 22 and 23 with respect to their associated ring gears, and upon the relative diameter of the gears 24 with respect to the gear 40 or 43.

If one of the sets of pinions is of the same ratio to its ring gear as the gear 24 is to the internal gear 43, the driven shaft will be held positively at rest, as the pinions will roll around on the associated fixed ring gear at the same speed that the gear 24 rolls against the internal gear 43. Consequently the internal gear 43 must remain at rest.

If the ratio between a set of pinions and their ring gear is less than the ratio between the gears 24 and the gear 43, the gear 43 and the shaft 14 will be rotated in one direction, whereas if the ratio is greater the gear 43 and shaft 14 will be rotated in the opposite direction.

Consequently this speed changing mechanism may be utilized for driving an automobile or other machine at various different speeds and for driving the machine in either a forward or reverse direction.

The mechanism and method of operation thus far described is substantially the same as that shown and described in my prior Patent No. 1,808,539, to which reference is made for a more complete description.

My present invention relates more particularly to the provision of improved means for selectively holding the ring gears 30 to 33 from rotation in such a way that a selected ring gear may be locked against rotation in one direction but may be free to rotate in the opposite direction.

For this purpose, each ring gear 30 to 33 is provided with ratchet teeth 50 (Figs. 5 and 6) around the outer peripheral surface, positioned for engagement with a pawl 51, made in the form of a plunger yieldingly moved downward to operative position by a spring 52. These plungers and springs are mounted in a supplementary casing member 54, secured to the top of the main casing 10.

Each plunger is slotted at its upper end, as shown at 55 in Figs. 5 and 6, and is provided with a roll 57 mounted on a cross pin 58. Bars 60 and 61 are mounted to slide in notched plates 62 secured to the ends of the casing 54 and said bars have pin-and-slot connections to levers 63 and 64.

These levers 63 and 64 may be connected for manual operation, either by foot or hand as may be desired.

Each bar 60 and 61 is provided with two adjacent recesses 66, so positioned that when one of the bars is moved endwise by its operating lever a recess 66 will be moved under a selected roll 57.

When this occurs, the spring 52 is free to depress the corresponding plunger and pawl so that the pawl will yieldingly engage its associated ring gear and will prevent rotation of the same in one direction, while permiting free rotation in the opposite direction.

Each of the bars 60 and 61 controls two of the spring pawls and may be moved to permit either one or the other to become operative. Each bar may also be moved to the intermediate position occupied by the bar 61 in Fig. 1, in which position both of the spring plungers controlled by said bar are held inoperative.

Assuming that the shaft 12 rotates in the clockwise direction indicated in Fig. 5, the pinions 20 will tend to carry the ring gear 30 along with the pinions and also in a clockwise direction, as indicated by the arrow $a$ in Fig. 5.

The ratchet teeth 50 are so faced that the pawl 51 will oppose rotation of the ring gear 30 in a clockwise direction and consequently power will be transmitted from the driving shaft 12 to the driven shaft 14.

If we now assume that for some reason, such as the coasting of an automobile, the shaft 14 tends to turn more rapidly than it is driven by the shaft 12, this more rapid rotation of the driven shaft 14 can only take place by rotation of the ring gear 30 in the reverse or anti-clockwise direction. Such reverse rotation is permitted by the pawl and ratchet locking mechanism which I have previously described.

If the ratio of the pinion 23 to the ring gear 33 is greater than the ratio of the gear 24 to the internal gear 43, locking of the gear 33 will cause the gear 43 to be rotated in the opposite direction from that in which it rotates when driven by the pinion 20 and ring gear 30.

In this case, the tendency of the ring gear 33 is to rotate in an anti-clockwise direction, as indicated by the arrow $b$ in Fig. 6, when transmitting power to the shaft 14. Consequently the ratchet teeth 50 and pawl 51 are reversed in direction, so that the pawl opposes rotation of the ring gear 33 in the direction of the arrow $b$ but permits free rotation thereof in the opposite direction.

As shown in Fig. 1, the gear ratios are such that the ring gears 31, 32 and 33 are to be locked against rotation in an anti-clockwise direction, while the ring gear 30 is used for reverse driving of the shaft 14 and is locked against rotation in a clockwise direction.

Such particular gear ratios are adapted for use in machines where reverse drives, each of different speeds, are desired and in which an increase in speed of the driven member in either direction is to be permitted.

When the invention is applied to an automobile, however, the construction shown in Fig. 7 is preferable, in which sets of pinions 70, 71, and 72 engage ring gears 80, 81 and 82 for driving the automobile forward at selected speeds, while a set of pinions 73 engage the ring gear 84 for a reverse drive. In this case, the ring gears 80, 81 and 82 are provided with ratchet teeth 85, adapted to be selectively engaged by spring-pressed pawls 86, as previously described.

All of these pawls are controlled by a single sliding bar 87, which may be operated by a foot lever or pedal 88, and which is provided with three recesses 89 to cooperate with the rolls 90. The bar 87 has four positions and may be set to raise all of the spring plungers, as shown in Fig. 7, or to allow any selected plunger to be depressed by its spring.

The ring gear 84 is provided with gear teeth 92, adapted to be engaged by similar teeth 93 (Fig. 8) on a block 94 slidable in dove-tailed guideways in the base 11.

The block 94 is manually controlled by a rod 95, and may be moved so that the teeth 93 on the block 94 will be brought into engagement with the teeth 92 on the ring gear 84, thus locking the ring gear from rotation in either direction. If this machine is used for driving an automobile, the gear 40 may be omitted if less speed changes are desired. Under these conditions the automobile may be driven backward but no free wheeling operation will be permitted.

It is also desirable at times to prevent free wheeling when driving the automobile in a forward direction. I may similarly provide each of the ring gears 80, 81 and 82 with gear teeth 92 and may provide for moving the block 94 into alignment with any one of the ring gears 80, 81 or 82. The rotation of these selected ring gears in either direction will then be positively prevented.

Instead of using the gear teeth and sliding block arrangement shown in Figs. 7 and 8 for positively holding a selected ring gear from rotation, I may use the brake band construction shown in Figs. 9 and 10, in which each ring gear is provided with a cylindrical friction surface 100 adapted to be engaged by a brake band 101, which may be selectively tightened by any convenient control device, such for instance as that shown in Figs. 5 and 7 of my prior Patent No. 1,808,539.

Having described the details of construction of my improved transmission mechanism, it will be evident that I have provided a very effective means by which power may be transmitted at any one of several selected speeds while, at the same time, free wheeling or excess rotation of the driven member in the same direction will be permitted. Furthermore, I have provided mechanism by which positive control of the speed may be obtained. When the latter mechanism is in use, no overrunning of the driven member is possible.

Having thus described my invention and the advantages thereof, I do not wish to be limited to the details herein disclosed otherwise than as set forth in the claims, but what I claim is:—

1. A variable speed transmission mechanism comprising a driving shaft, a driven shaft, a carrier rotatable with said driving shaft, a plurality of short shafts mounted in bearings in said carrier and freely rotatable therein, a series of pinions of different sizes on each of said short shafts, a plurality of ring gears each meshing with all of the pinions of one size on all of said short shafts, certain of said ring gears when held from rotation rendering said driving shaft effective to rotate said driven shaft in a forward direction and certain of said ring gears effecting rearward rotation of said driven shaft, means to selectively hold any one of said first ring gears from rotation in one direction only, and means to selectively hold any one of said second ring gears from rotation in the opposite direction.

2. A variable speed transmission mechanism comprising a driving shaft, a driven shaft, a carrier rotatable with said driving shaft, a plurality of short shafts mounted in bearings in said carrier and freely rotatable therein, a series of pinions of different sizes on each of said short shafts, a plurality of ring gears each meshing with all of the pinions of one size on all of said short shafts, certain of said ring gears when held from rotation rendering said driving shaft effective to rotate said driven shaft in a forward direction and an additional ring gear effecting rearward rotation of said driven shaft, means to selectively hold any one of said first ring gears from rotation in one direction only, and means to hold said additional ring gear from rotation in either direction.

3. A variable speed transmission mechanism comprising a driving shaft, a driven shaft, a carrier rotatable with said driving shaft, a plurality of short shafts mounted in bearings in said carrier and freely rotatable therein, a series of pinions of different sizes on each of said short shafts, a plurality of ring gears each meshing with all of the pinions of one size on all of said short shafts, certain of said ring gears when held from rotation rendering said driving shaft effective to rotate said driven shaft in a forward direction and an additional ring gear effecting rearward rotation of said driven shaft, means to selectively hold any one of said first ring gears from rotation in one direction only, and means to hold said additional ring gear from rotation in either directions, said latter means being also selectively operative to lock any one of said first ring gears from rotation in either direction.

4. A variable speed transmission mechanism comprising a driving shaft, a driven shaft, a carrier rotatable with said driving shaft, a plurality of short shafts mounted in bearings in said carrier and freely rotatable therein, a series of pinions of different sizes on each of said short shafts, a plurality of ring gears each meshing with all of the pinions of one size on all of said short shafts, said ring gears being provided with ratchet teeth, spring-pressed pawls positioned for selective engagement with said ratchet teeth, and manual means to release a selected pawl, thereby locking the associated ring gear from rotation in one direction only.

In testimony whereof I have hereunto affixed my signature.

ERNST GESSNER.